(12) United States Patent
Omvik et al.

(10) Patent No.: US 6,362,829 B1
(45) Date of Patent: Mar. 26, 2002

(54) METHOD FOR MODIFYING A DIGITAL IMAGE

(75) Inventors: John F. Omvik, North Andover, MA (US); Earle B. Stokes, Berchem (BE)

(73) Assignee: Agfa Corporation, Wilmington, MA (US)

( * ) Notice: Subject to any disclaimer, the term of this patent is extended or adjusted under 35 U.S.C. 154(b) by 782 days.

(21) Appl. No.: 08/614,775

(22) Filed: Mar. 7, 1996

(51) Int. Cl.$^7$ .................................................. G09G 5/02
(52) U.S. Cl. ........................ 345/593; 345/440; 345/594; 345/601; 345/771
(58) Field of Search ................................ 345/150, 153, 345/154, 186, 589, 593, 594, 600, 601, 603, 764, 773, 771, 440; 358/518, 519, 520

(56) References Cited

U.S. PATENT DOCUMENTS

| | | | |
|---|---|---|---|
| 5,442,375 A | * | 8/1995 | Wojaczynski et al. ...... 345/153 |
| 5,483,259 A | * | 1/1996 | Sachs ......................... 345/153 |
| 5,499,040 A | * | 3/1996 | McLaughlin et al. ....... 345/150 |
| 5,521,615 A | * | 5/1996 | Boyan ........................ 345/150 |

FOREIGN PATENT DOCUMENTS

| | | |
|---|---|---|
| EP | 0 313 796 | 5/1989 |
| WO | WO 92/20024 | 11/1992 |

* cited by examiner

*Primary Examiner*—Dennis-Doon Chow
(74) *Attorney, Agent, or Firm*—John A. Merecki

(57) ABSTRACT

A method for selecting color value on a digital image, initializing a color modification tool to the selected color value, and then modifying the color value. After selecting a color modification tool such as a contrast LUT, a user selects a region on a digital image containing the color value to be modified. The selected region is highlighted, and a knot corresponding to the selected color value is automatically placed on the input/output LUT graph of the color modification tool. A slide bar, and a graphic readout providing the "before" and "after" values of the selected color value, are superimposed directly on the digital image adjacent the highlighted region. The user can then modify the selected color value by displacing the slide bar. The digital image, graphic readout, and the input/output LUT graph of the modification tool are updated in response to the manipulation of the slide bar, allowing the user to immediately visualize the affect of the color change on the digital image.

10 Claims, 6 Drawing Sheets

METHOD FOR MODIFYING A DIGITAL IMAGE

FIELD OF THE INVENTION

The present invention relates in general to the modification of a digital image using a modification tool such as a color or contrast look-up table (LUT).

BACKGROUND OF THE INVENTION

When using traditional color modification LUTs, color values are adjusted by creating and manually dragging specific control points or "knots" on an input/output LUT graph until the desired color values are produced. Heretofore, the creation and manipulation of a knot on a LUT graph has required multiple steps including the measurement of a color value to be modified, the initialization (e.g., placement) of the knot on the LUT graph at a point corresponding to the measured color value, and the displacement of the knot to modify the measured color value by manipulating the input/output relationship of the LUT graph. Various embodiments of this multi-step process have used in the prior art with limited success. For example, in a first embodiment, a user measures a color value on a digital image using a known method, then defines, through trial and error, a knot on the LUT graph that will best affect the color value of interest. The knot is then manipulated to vary the input/output relationship of the LUT graph. In a second embodiment, the user samples a color in a digital image using a pointer, and a tick mark representing the sampled color appears on the LUT graph. The user then positions a knot as accurately as possible on the tick mark, and manipulates the knot to adjust the color value of interest. In yet another prior art embodiment, the user selects a color value from the digital image, and a knot representing the selected color value automatically appears on the LUT graph. The LUT graph is subsequently manipulated through a manual displacement of the knot.

SUMMARY OF THE INVENTION

The present invention provides a simplified method for selecting a color value on a digital image, initializing a color modification tool to the selected color value, and then modifying the color value.

After selecting a color modification tool such as a contrast LUT, the user selects a region on a digital image containing the color value to be adjusted. The selected region is highlighted, and a knot corresponding to the selected color value is automatically placed on the input/output LUT graph of the modification tool. In addition, a slide bar or other suitable control mechanism, and a graphic readout (e.g., numeric display) providing the "before" and "after" values of the selected color value, are superimposed directly on the digital image adjacent the highlighted region. When the slide bar is displaced to modify the selected color value, the digital image, the graphic readout, and the input/output LUT graph of the modification tool are updated, thereby allowing the user to immediately visualize the affect of the color change on the digital image. Thus, a user can accurately modify a color value via the slide bar without having to directly manipulate the position of a knot on the LUT graph of the modification tool. When the user is satisfied with the modification of the color value within the selected region, the slide bar and graphic readout disappear. However, the color change is saved and the selected region remains highlighted, allowing the user to return to that region if additional color changes become necessary.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
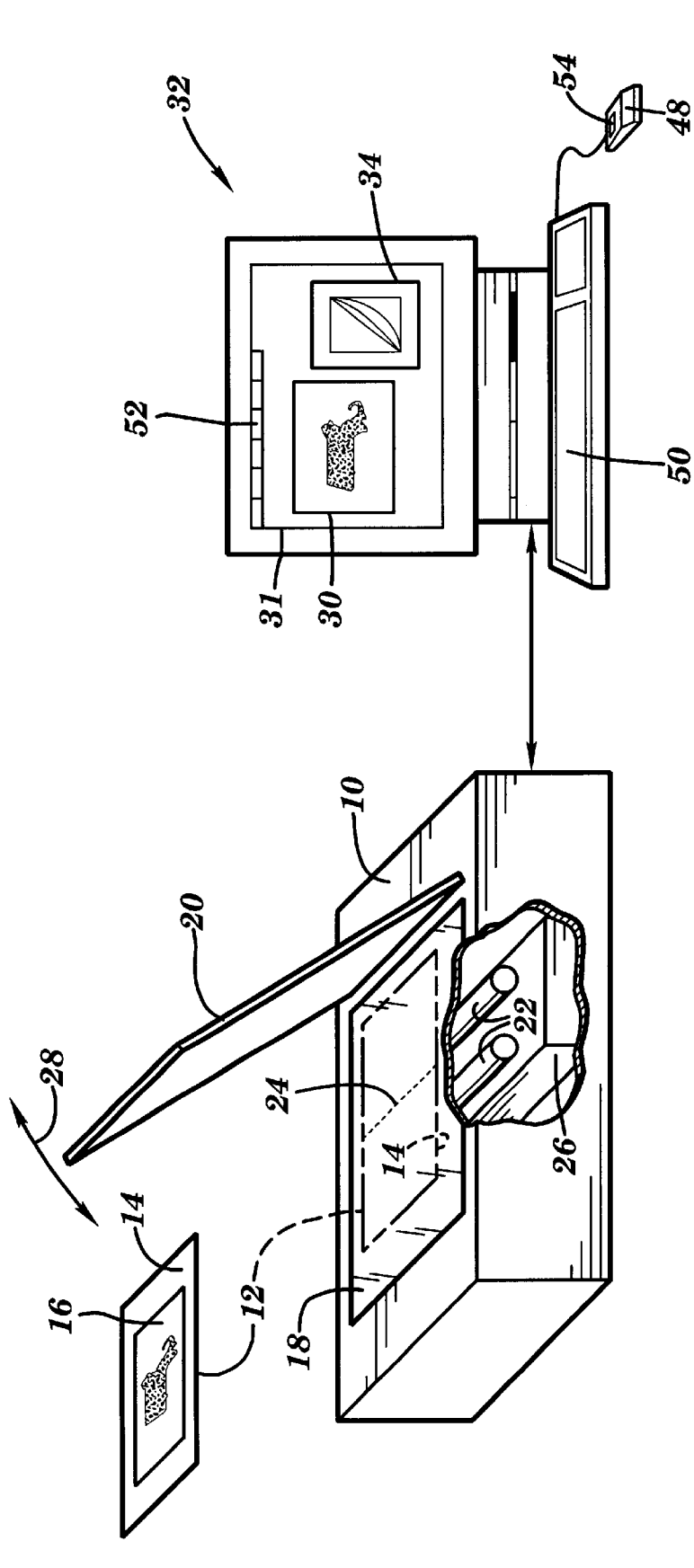
FIG. 1 illustrates a prior art scanning system including a scanner and a workstation.

Referring now specifically to the accompanying drawings, there is illustrated a method for modifying a digital image in accordance with the present invention, wherein like reference numerals refer to like elements throughout the drawings.

In FIG. 1, a scanning system 10 is configured for the scanning of a reflective original 12. The reflective original 12 is placed with the surface 14 containing the image 16 to be scanned facing down on a transparent scanning surface 18, and held in place by a cover 20. The surface is illuminated from below by lamps 22, producing a scan line 24. The scanning optics and sensor electronics are located in a scan module 26, which is driven together with lamps 22 to move the scan line 24 across the length of the original 12, thereby scanning the original 12 to produce a digital representation thereof. The cover 20 is pivotally secured on one side to the main body of the scanning system 10 via a hinge mechanism (not shown), thereby allowing the cover 20 to be raised and lowered in its entirety as indicated by directional arrow 28 to position one or more reflective originals 12 on the transparent scanning surface 18.

A digital representation of an image 30, obtained, for example, using the above-described scanning system 10 (preview or final scan), is displayed on the display 31 of a workstation 32. A color modification tool 34, forming a portion of the scanner driver controlling the operation of the scanning system 10, or accessed via a stand-alone image editing program such as Adobe's PHOTOSHOP™, is used, if necessary, to modify the color characteristics of the digital image 30.

Figure 2:
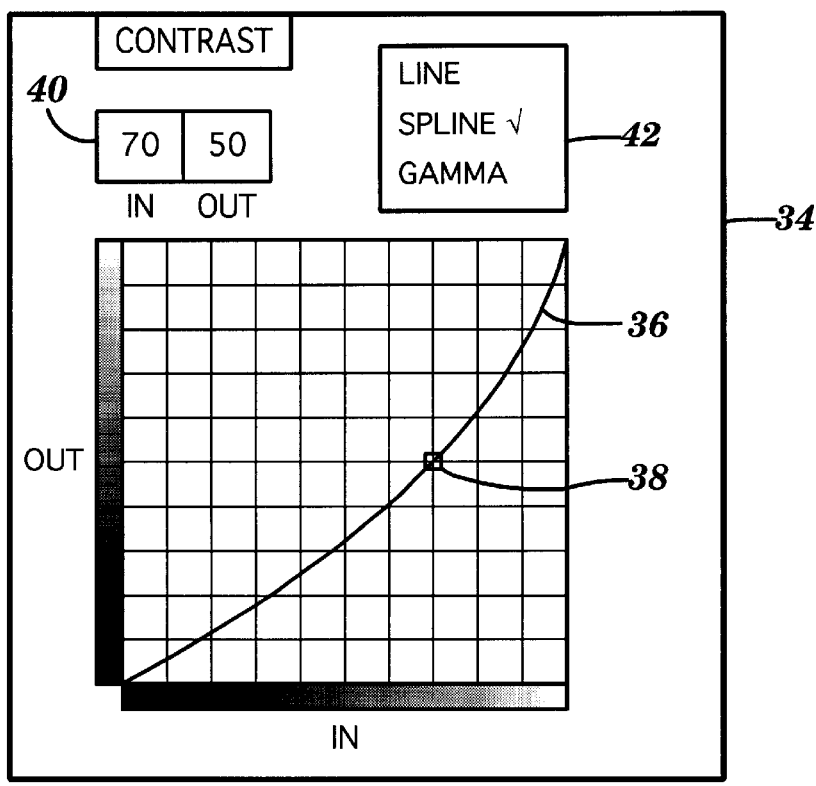
FIG. 2 illustrates a conventional contrast LUT.

A conventional color modification tool 34, taken in this example to be a contrast LUT, is illustrated in FIG. 2. The tool 34 includes an input/output graph 36, which may be manipulated by displacing one or more knots 38 to modify the contrast of the digital image. The tool 34 further includes a numeric display 40 which provides information corresponding to the before (IN) and after (OUT) color values represented by a specific knot point 38, and a dialog box 42 which allows the user to choose the editing mode of the LUT graph 36. As known in the art, a LUT graph can be edited, for example, in line, spline or gamma mode. In line mode, each knot 38 moves only the two adjacent line segments. In spline mode, the knots 38 are connected as a smooth Bezier curve. In gamma mode, only a single knot 38 is used and the curve is calculated using a gamma function. Typically, in gamma mode, the user is provided with a means (not shown), such as a text entry field, for setting the value of the gamma function. In the contrast LUT of FIG. 2, and in the following description of the present invention, a spline editing mode is used.

Figure 3:
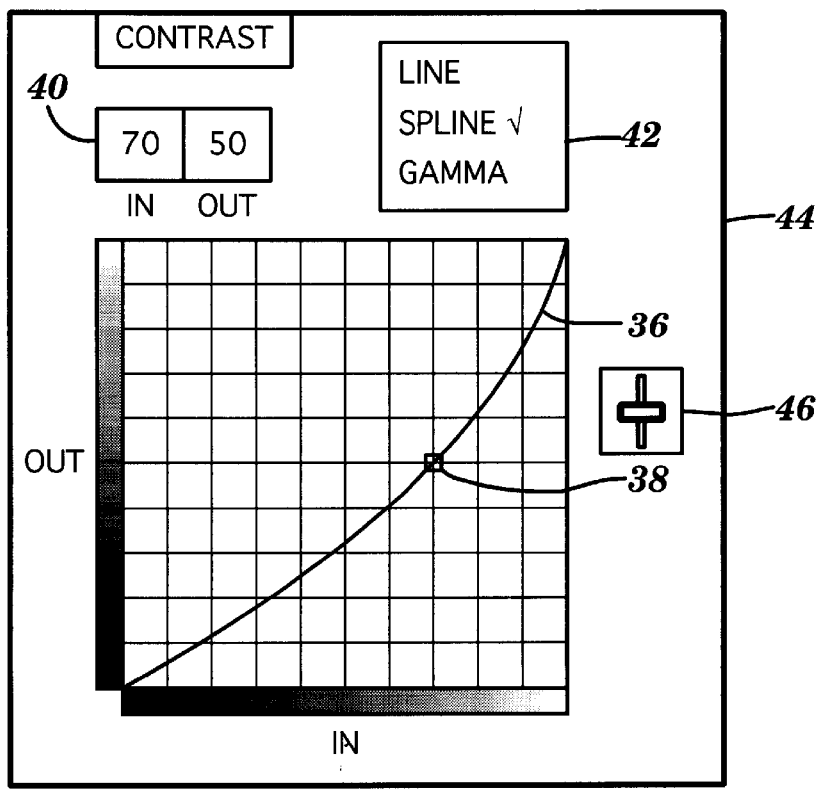
FIG. 3 illustrates a contrast LUT including a button for activating the method of the present invention.

A color modification tool 44 incorporating the method of the present invention, wherein the color modification tool 44 is again taken to be a contrast LUT, is illustrated in FIG. 3. The tool 44 is similar to the previously described tool 34, and further includes a slider button 46 for initiating the use of the present invention. The slider button 46 may be activated by a user via a mouse 48, from a preset key combination on a keyboard 50, by accessing a menu 52, or through any other suitable means.

Figure 4:
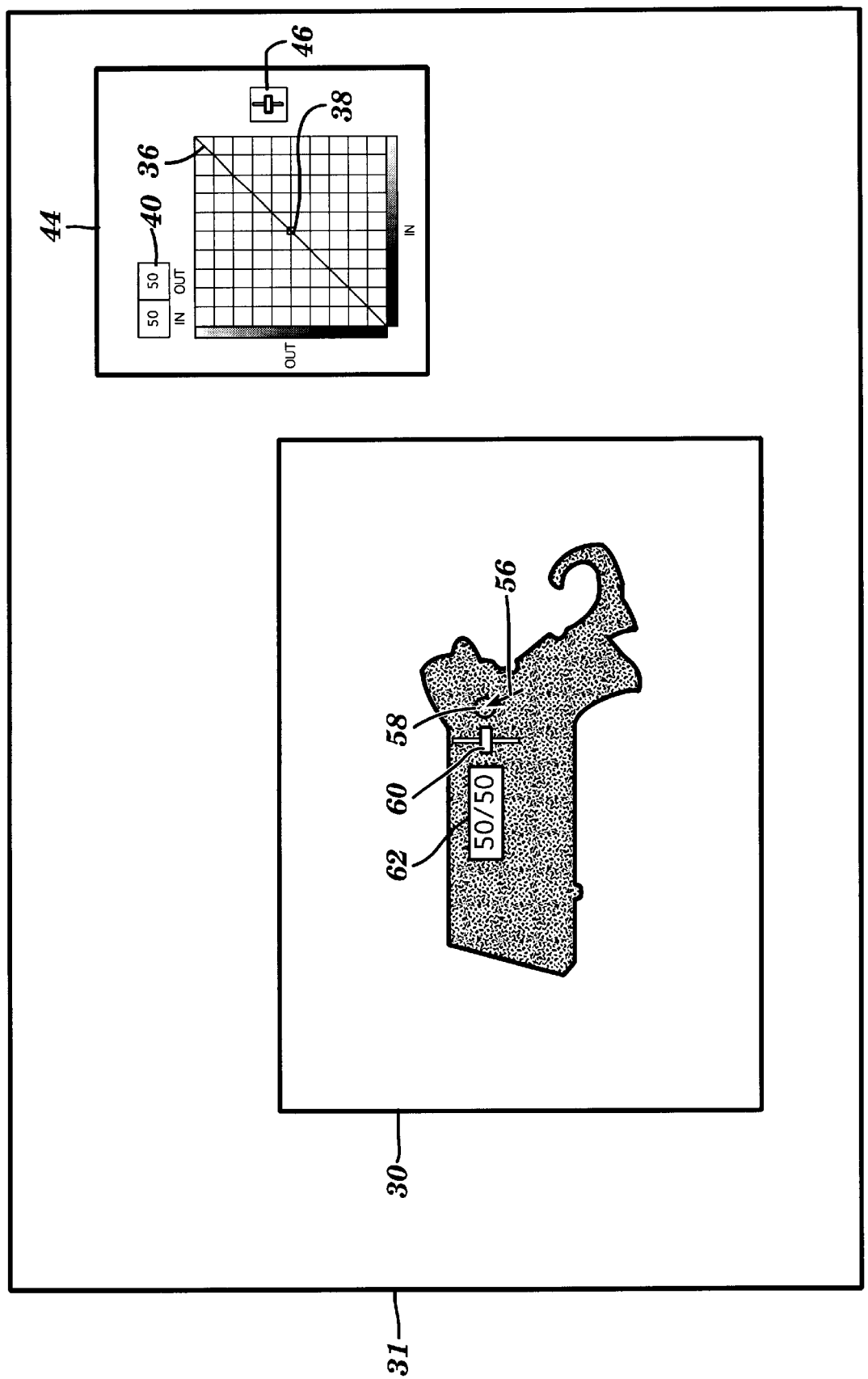
FIGS. 4–7 illustrate a preferred embodiment of the present invention.

After the slider button 46 has been activated, a user can modify a color value directly on the digital image 30 without having to manually manipulate a knot 38 on the LUT graph 36. First, as illustrated in FIG. 4, the user selects a color value to be modified on the digital image 30 by pressing a button 54 on the mouse 48 when the mouse pointer 56 is positioned over the color value of interest. When the mouse button 54 is depressed, a highlighting circle 58 appears on the digital image 30 around the selected color value, a slide bar 60 appears adjacent the highlighting circle 58, and a numeric display 62, providing the before (IN) and after (OUT) values of the selected color value, appears next to the slide bar 60. In FIG. 4, for example, the before and after values of the selected color value are identical in the numeric display 62, indicating that the selected color value has not yet been modified. The unmodified state of the selected color value is also indicated by the numeric display 40 and the input/output graph 36 of the color modification tool 44.

While continuing to depress the mouse button 54, the user can modify the selected color value by displacing the slide bar 60 using the mouse pointer 56. As the slide bar 60 is displaced, the digital image 30, the numeric displays 62, 40, and the LUT graph 36 are updated to provide the user with immediate visual feedback of the resultant color modification. Of course, it should be clear that other types of control mechanisms, such as a dial and the like may be used to modify the selected color value without departing from the intended scope of the present invention. Advantageously, the selected color value is easily and interactively modified via the displacement of the slide bar 60, without requiring, as in the prior art, the direct manual manipulation of a knot point 38 on the color modification tool 44.

In the preferred embodiment of the present invention, the numeric display 62 is superimposed directly on the digital image 30 adjacent the highlighting circle 58. In an alternate implementation of the present invention, however, the numeric display 62 is not required. In this embodiment, the INPUT/OUTPUT relationship of a modified color value is displayed on the numeric display 40 of the color modification tool 44 and/or in a conventional cursor readout display.

Figure 5:
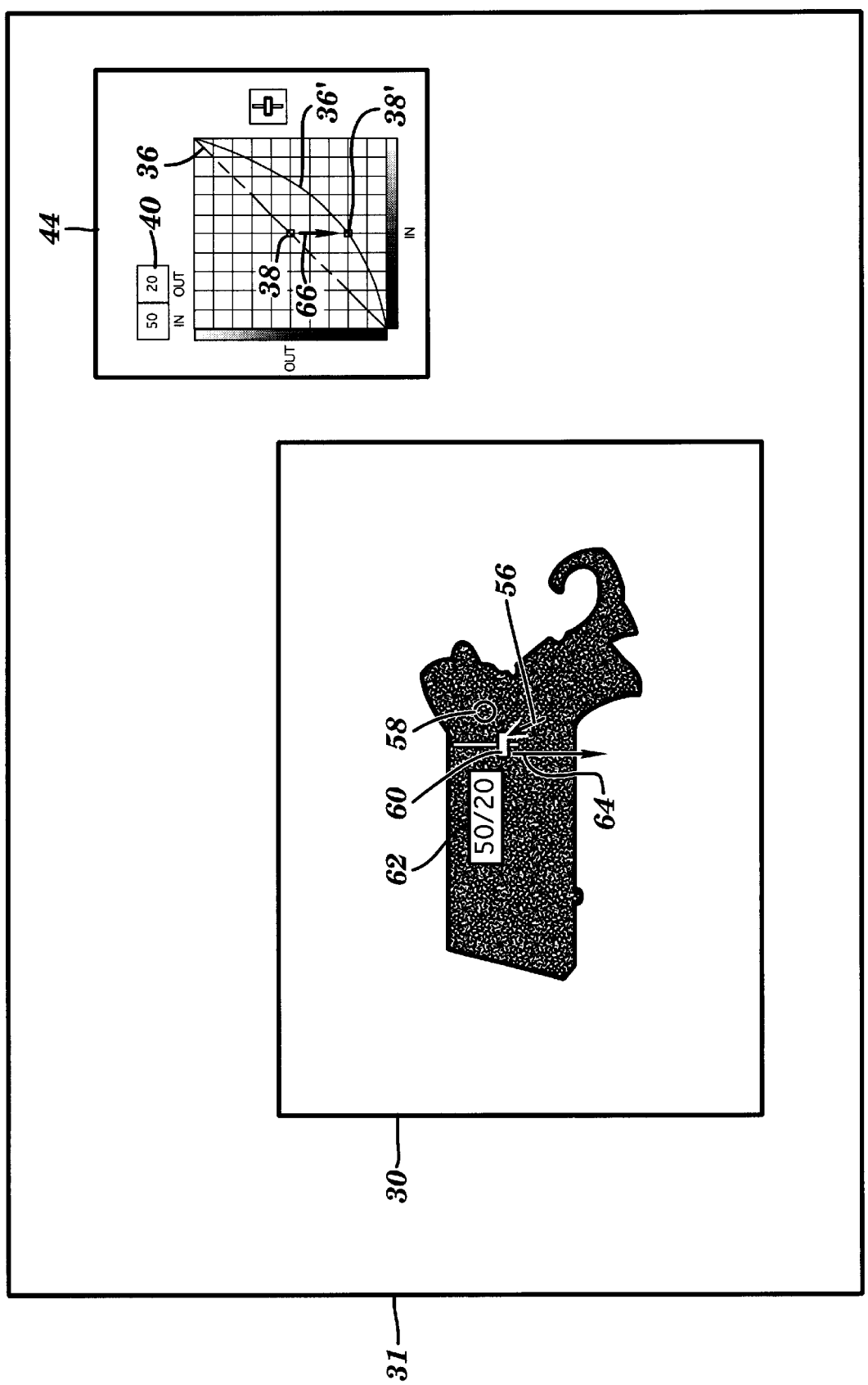

An example of a color modification is illustrated in FIG. 5. As shown, the slide bar 60 has been displaced downward using mouse pointer 56 (directional arrow 64), effectively decreasing (i.e., darkening) the OUT value of the selected color. During the displacement of the slide bar 60, the digital image 30 is immediately updated to reflect the modification of the selected color value. This can be seen through a comparison of the digital image 30 in FIGS. 4 and 5. As the slide bar 60 is displaced, the knot point 38 on the LUT graph 36 of the color modification tool 44 is automatically displaced to point 38' (directional arrow 66), producing a modified LUT graph 36'.

Figure 6:
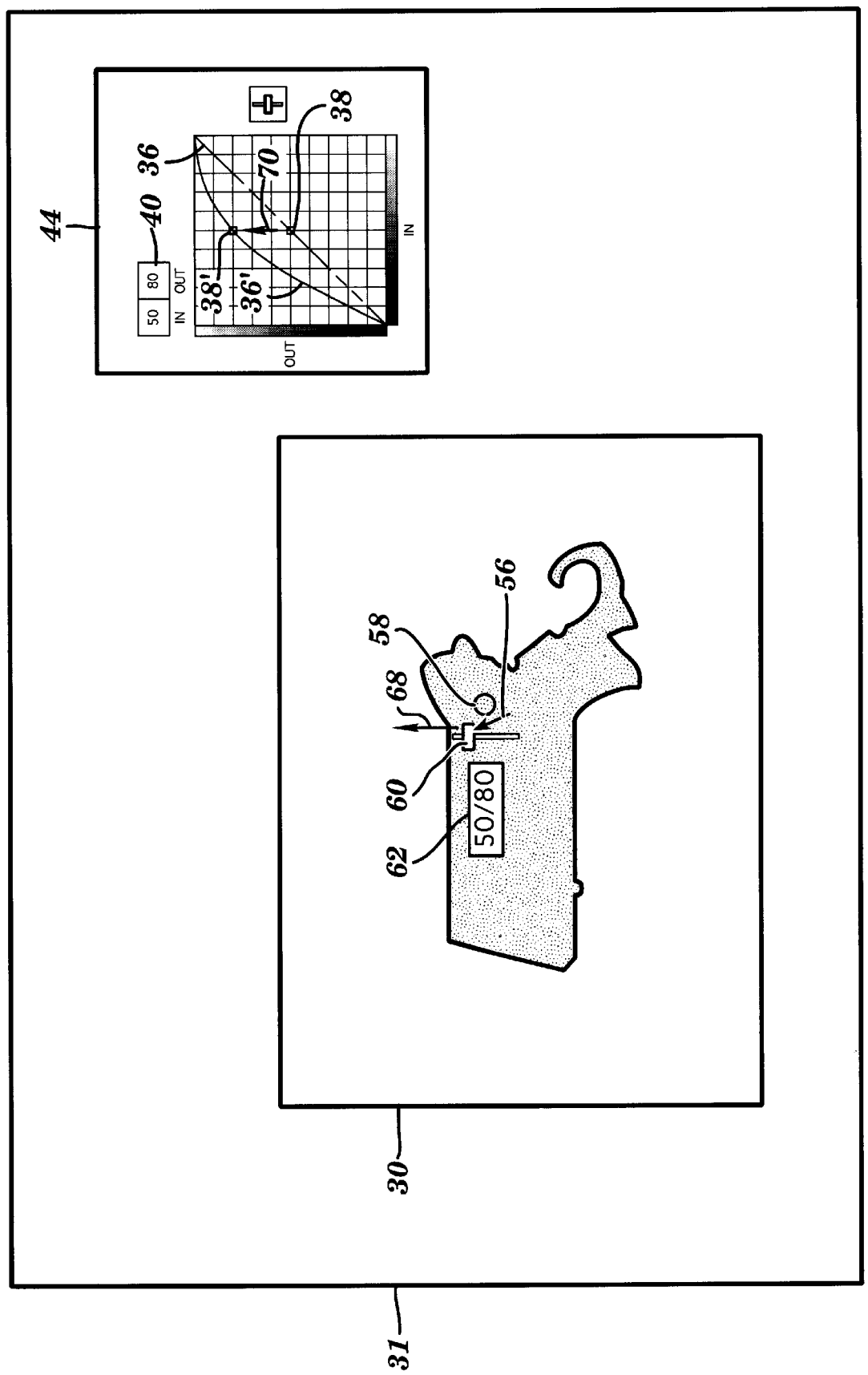

A further example of a color modification is illustrated in FIG. 6, wherein the OUT value of the selected color has been increased (i.e., lightened) by displacing the slide bar 60 upward using mouse pointer 56 (directional arrow 68). Once again, the digital image 30 and the LUT graph 36 are immediately updated to reflect the modification of the selected color value during the displacement of the slide bar 60. In this example, the knot point 38 on the LUT graph 36 is automatically displaced to point 38' (directional arrow 70), thereby producing a modified LUT graph 36'.

Figure 7:
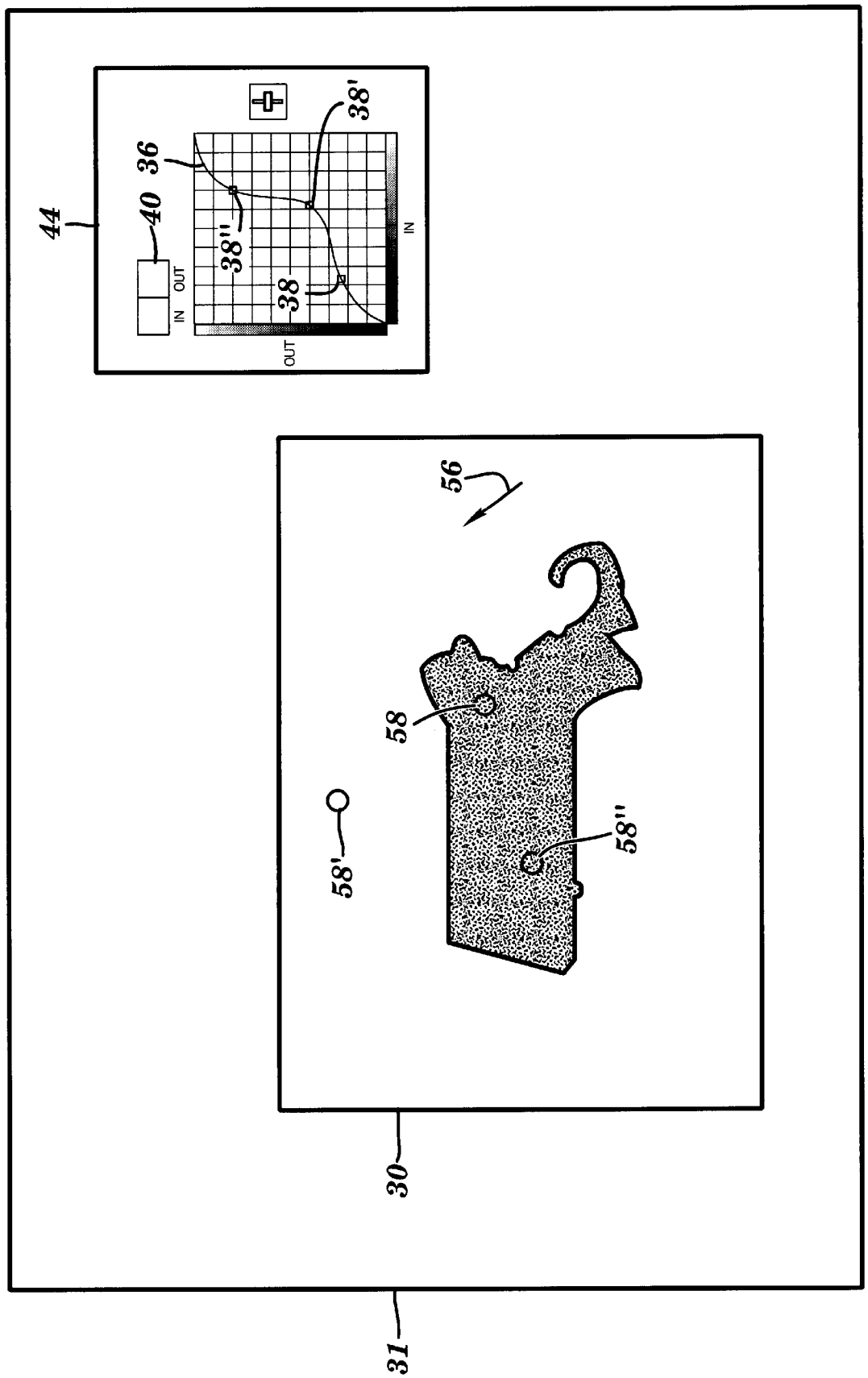

The modification of the selected color value is completed in response to the release of the mouse button 54. When the mouse button 54 is released, the slide bar 60 and the numeric display 62 disappear, and the color modification information corresponding thereto is stored in memory. The highlighting circle 58, however, remains on the digital image 30, allowing the user to return to that region if additional color changes become necessary. Finally, the knot 38 representing the completed color modification, remains on the LUT graph 36 of the color modification tool 44. As shown in FIG. 7, multiple color modifications can be performed on the digital image 30, each represented by a highlighting circle 58, 58', 58", . . ., on the digital image 30, and a corresponding knot point 38, 38', 38", . . ., on the LUT graph 36.

To edit a previously completed color modification, the user positions the mouse pointer 56 over a highlighting circle 58 of interest and depresses the mouse button 54. In response, the color modification information corresponding to the selected highlighting circle 58 is accessed from memory, and the slide bar 60 and numeric display 62 reappear on the digital image 30, allowing the user to perform further color modifications.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

We claim:

1. A method for modifying a color value in a digital image, comprising the steps of:

selecting a region of said digital image containing a color value to be modified;

superimposing a control mechanism for modifying said color value on said digital image adjacent said selected region;

superimposing a graphic readout providing information corresponding to said color value on said digital image adjacent said selected region;

modifying said color value by manipulating said control mechanism;

updating said digital image according to the modification of said color value; and displaying information corresponding to the modification of said color value on said graphic readout.

2. The method for modifying a color value in a digital image according to claim 1, wherein said step of selecting a region of said digital image further includes the step of:

highlighting said selected region.

3. The method for modifying a color value in a digital image according to claim 2, further including the step of:

removing said control mechanism and said graphic readout from said digital image upon completion of the modification of said color value, said selected region remaining highlighted; and storing information corresponding to the modification of said color value.

4. The method for modifying a color value in a digital image according to claim 3, further including the step of:
   accessing the stored information corresponding to the modification of said color value upon an actuation of said highlighted region; and
   redisplaying said control mechanism and said graphic readout on said digital image, wherein said control mechanism and said graphic readout are adjusted according to said accessed information.

5. The method for modifying a color value in a digital image according to claim 1, further including the step of:
   activating said method from a color modification tool.

6. The method for modifying a color value in a digital image according to claim 5, wherein said color modification tool includes a look-up table (LUT) graph, further including the step of:
   updating said LUT graph according to the modification of said color value.

7. The method for modifying a color value in a digital image according to claim 6, wherein said LUT graph is updated by placing a knot on said LUT graph in a position corresponding to the modification of said color value.

8. The method for modifying a color value in a digital image according to claim 1, wherein said control mechanism includes a slider button, and wherein said color value is modified by adjusting a relative position of said slider button.

9. The method for modifying a color value in a digital image according to claim 1, wherein the information displayed on said graphic readout includes information corresponding to said color value before and after a modification thereof.

10. A method for modifying a color value in a digital image, comprising the steps of:
   selecting a region of said digital image containing a color value to be modified;
   superimposing a control mechanism for modifying said color value on said digital image adjacent said selected region;
   modifying said color value by manipulating said control mechanism;
   updating said digital image according to the modification of said color value; and
   displaying information corresponding to the modification of said color value on a graphic readout.

* * * * *